US011341788B2

(12) United States Patent
Khanna

(10) Patent No.: US 11,341,788 B2
(45) Date of Patent: May 24, 2022

(54) SYSTEM AND METHOD FOR PROVIDING TUNING ASSISTANCE FOR A MOTORCYCLE

(71) Applicant: Honda Motor Co., Ltd., Tokyo (JP)

(72) Inventor: Rahul Khanna, Mountain View, CA (US)

(73) Assignee: Honda Motor Co., Ltd., Tokyo (JP)

( * ) Notice: Subject to any disclaimer, the term of this patent is extended or adjusted under 35 U.S.C. 154(b) by 154 days.

(21) Appl. No.: 16/361,601

(22) Filed: Mar. 22, 2019

(65) Prior Publication Data
US 2020/0302704 A1    Sep. 24, 2020

(51) Int. Cl.
| | |
|---|---|
| *G07C 5/02* | (2006.01) |
| *H04W 4/48* | (2018.01) |
| *G07C 5/06* | (2006.01) |
| *B62J 99/00* | (2020.01) |
| *G07C 5/00* | (2006.01) |
| *B62J 45/40* | (2020.01) |
| *B62J 50/20* | (2020.01) |

(52) U.S. Cl.
CPC ............... *G07C 5/02* (2013.01); *B62J 99/00* (2013.01); *G07C 5/008* (2013.01); *G07C 5/06* (2013.01); *H04W 4/48* (2018.02); *B62J 45/40* (2020.02); *B62J 50/20* (2020.02)

(58) Field of Classification Search
CPC ............ G07C 5/02; G07C 5/008; G07C 5/06; H04W 4/48; B62J 99/00; B62J 50/20; B62J 45/40; F02D 41/1498; F02D 2200/025; G01M 1/225; G01M 17/0072; F01N 1/165
See application file for complete search history.

(56) References Cited

U.S. PATENT DOCUMENTS

| | | | |
|---|---|---|---|
| 4,463,610 | A | 8/1984 | Anderson, III et al. |
| 7,810,469 | B2 | 10/2010 | Vigild et al. |
| 9,164,957 | B2 | 10/2015 | Hassib et al. |
| 9,170,982 | B2 | 10/2015 | Blumer |
| 9,200,981 | B2 | 12/2015 | Horlbeck et al. |
| 9,646,427 | B2 | 5/2017 | Chen et al. |
| 9,694,746 | B2 | 7/2017 | Jo |
| 9,779,557 | B2 | 10/2017 | Hauser et al. |

(Continued)

FOREIGN PATENT DOCUMENTS

| | | |
|---|---|---|
| CN | 106780829 A | 5/2017 |
| JP | 2015038672 A | 2/2015 |

*Primary Examiner* — Rachid Bendidi
*Assistant Examiner* — Andrew J Cromer
(74) *Attorney, Agent, or Firm* — Mark E. Duell; American Honda Motor Co., Inc.

(57) ABSTRACT

A mobile communication device to provide tuning assistance for a motorcycle. The mobile communication device includes a plurality of sensing devices and a processor. The processor controls the plurality of sensing devices to capture a first signal over a period of time based on a trigger input. The first signal corresponds to at least one component of the motorcycle in a first operational state of the motorcycle. The processor further detects a deviation between one or more parameters of the captured first signal and baseline information corresponding to the first operational state of the motorcycle. The baseline information indicates a range of baseline values. The processor further output tuning information based on a determination that the detected deviation is out of the range of baseline values.

19 Claims, 6 Drawing Sheets

(56) References Cited

U.S. PATENT DOCUMENTS

| | | |
|---|---|---|
| 9,841,354 B2 | 12/2017 | Cheung et al. |
| 9,940,921 B2 | 4/2018 | Park et al. |
| 2003/0221487 A1* | 12/2003 | Silvagi .................... G01M 1/02 73/462 |
| 2007/0027607 A1* | 2/2007 | Norris ................. F02D 41/1498 701/100 |
| 2012/0226424 A1 | 9/2012 | Adams |
| 2014/0069195 A1 | 3/2014 | Ledbetter |
| 2015/0039269 A1 | 2/2015 | Mejegard |
| 2015/0040650 A1* | 2/2015 | Lacaille ................ G01M 15/14 73/112.01 |
| 2015/0100221 A1* | 4/2015 | Routledge ............... F01N 1/165 701/111 |
| 2016/0125669 A1 | 5/2016 | Meyer et al. |
| 2016/0247331 A1* | 8/2016 | Cacabelos ............ G07C 5/0808 |
| 2016/0377506 A1 | 12/2016 | Bizub |
| 2017/0000319 A1 | 1/2017 | Iizuka |
| 2017/0069144 A1 | 3/2017 | Lawrie-fussey et al. |
| 2018/0190041 A1 | 7/2018 | Hanson et al. |

* cited by examiner

SYSTEM AND METHOD FOR PROVIDING TUNING ASSISTANCE FOR A MOTORCYCLE

BACKGROUND

Many new technologies for vehicles are being developed to diagnose faults related to various components of the vehicles. Various diagnostic tools are known which collects diagnostic data from one or more sensors in-built in the vehicle. In certain scenarios, a user of the vehicle has to visit a particular diagnostic center in which such diagnostic tools are available. In another scenario, the user has to explicitly connect the diagnostic tool with the vehicle through standard cables and follow tedious diagnostic procedures. Conventional solutions may be inefficient to monitor the faults and provide effective diagnostic solutions to the user on real-time basis. Thus, an advanced and smart system may be desired which may perform real-time measurement of the diagnostic data of the vehicle and accordingly provide different diagnostic solutions efficiently.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A mobile communication device to provide tuning assistance for a motorcycle may include a plurality of sensing devices and one or more processors coupled to the plurality of sensing devices. The one or more processors may be configured to control the plurality of sensing devices to capture a first signal over a period of time based on a trigger input, wherein the first signal may correspond to at least one component of the motorcycle in a first operational state from a plurality of operational states of the motorcycle. The one or more processors may be further configured to extract one or more parameters from the captured first signal and detect a deviation between the extracted one or more parameters and baseline information corresponding to the first operational state of the motorcycle. The deviation may indicate tuning information associated with the at least one component of the motorcycle, and wherein the baseline information may indicate a range of baseline values. The one or more processors may be further configured to output the tuning information based on a determination that the detected deviation is out of the range of baseline values.

A method for providing tuning assistance for a motorcycle in a mobile communication device. The mobile communication device may include a plurality of sensing devices and at least one processor. The method comprising controlling, by the at least one processor, the plurality of sensing devices to capture a first signal over a period of time based on a trigger input, wherein the first signal may correspond to at least one component of the motorcycle in a first operational state from a plurality of operational states of the motorcycle. The method further comprising extracting, by the at least one processor, one or more parameters from the captured first signal and detecting, by the at least one processor, a deviation between the extracted one or more parameters and baseline information corresponding to the first operational state of the motorcycle. The deviation may indicate tuning information associated with the at least one component of the motorcycle, and wherein the baseline information may indicate a range of baseline values. The method further comprising, by the at least one processor, output the tuning information based on a determination that the detected deviation is out of the range of baseline values.

DETAILED DESCRIPTION

Various embodiments of the present disclosure may be found in mobile communication device to provide tuning assistance for a motorcycle. The mobile communication device (for example a mobile phone, a smart phone, etc.) may include a plurality of sensing devices, for example an audio capturing device (like microphone) and a vibration capturing device (like accelerometer). The mobile communication device may control the plurality of sensing devices to capture a signal of the motorcycle in proximity or in-contact to/with the mobile communication device. The signal may relate to a sound or vibration produced by an engine of the motorcycle in case the engine is not tuned correctly or out-of-tune. The mobile communication device may determine a rotation per minute (RPM) of the engine and a throttle position of the motorcycle based on the captured signal. The mobile communication device may further determine whether the engine of the motorcycle is tuned or out-of-tune based on the captured signal.

The mobile communication device may also determine a degree of out-of-tune based on parameters associated with the captured signal. The mobile communication device may further provide one or more trouble shooting instruction to a user associated with the mobile communication device or with the motorcycle to properly tune the motorcycle based on the determination of out-of-tune. Thus, the mobile communication device enables an efficient and dynamic solution to monitor the RPM, the throttle position, and out-of-tune status of the motorcycle using in-built sensing devices (such as the audio or vibration capturing device), and to provide various troubleshooting solutions on run-time basis.

Figure 1:
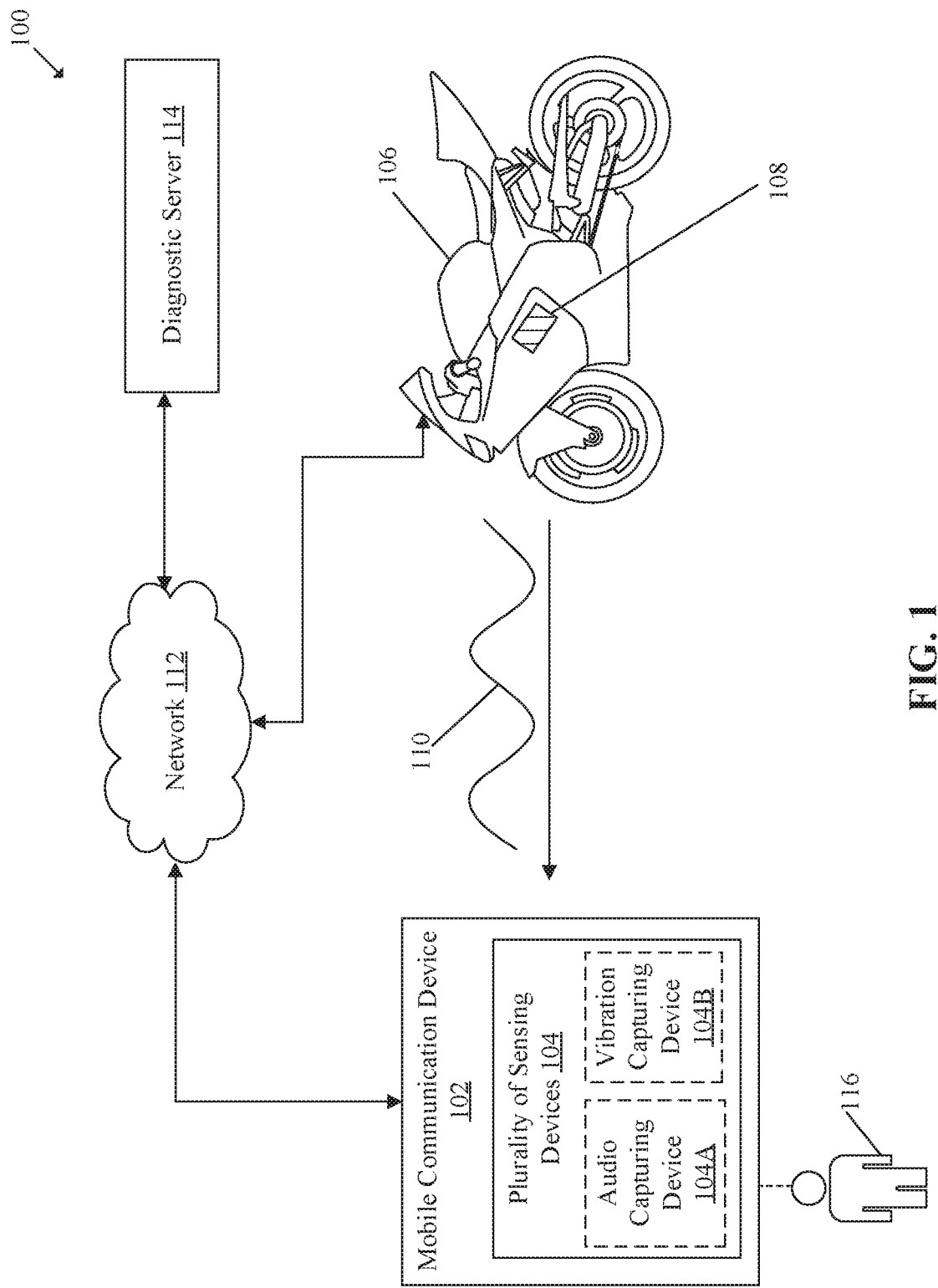
FIG. 1 is a block diagram that illustrates an exemplary network environment for a mobile communication device to provide tuning assistance for a motorcycle, in accordance with an embodiment of the disclosure.

FIG. 1 is a block diagram that illustrates an exemplary network environment for a mobile communication device to provide tuning assistance for a motorcycle, in accordance with an embodiment of the disclosure. With reference to FIG. 1, there is shown a network environment 100. The network environment 100 may include a mobile communication device 102, a motorcycle 106, a network 112, and a diagnostic server 114. The mobile communication device 102 may include a plurality of sensing devices 104. The plurality of sensing devices 104 may include an audio capturing device 104a and a vibration capturing device 104b. The motorcycle 106 may include an engine 108. There is further shown a first signal 110 generated by the motorcycle 106 (or the engine 108). There is further shown a user 116 that is associated with the mobile communication device 102 and/or the motorcycle 106. The user 116 may be a rider of the motorcycle 106. The user 116 may be a person who owns or uses the mobile communication device 102 for different operations.

The mobile communication device 102 may comprise suitable logic, circuitry, interfaces, and/or code that may be configured to control the plurality of sensing devices 104 to capture the first signal 110 generated from a component (such as the engine 108) of the motorcycle 106. The first signal 110 may be a first audio signal in surrounding of the mobile communication device 102. The mobile communication device 102 may control the audio capturing device 104a to capture the first audio signal generated from the component (such as the engine 108) of the motorcycle 106. In some embodiments, the first signal 110 may be a first vibration signal. The mobile communication device 102 may control the vibration capturing device 104b to capture the first vibration signal generated from the component (such as the engine 108) of the motorcycle 106 when the mobile communication device 102 is in-contact with the motorcycle 106. The mobile communication device 102 may be further configured to output tuning information (for example out-of-tune information) associated with the component (such as the engine 108) of the motorcycle 106 based on the captured first signal 110 and baseline information stored in the mobile communication device 102. Examples of the mobile communication device 102 may include, but are not limited to, a smartphone, a cellular/mobile phone, a personal digital assistance (PDA), a handheld computer, an audio-video (AV) entertainment device, a virtual-reality (VR) device, a computing device, a gaming device, and/or a consumer electronic (CE) device with audio capturing capability.

The audio capturing device 104a may comprise suitable logic, circuitry, interfaces, and/or code that may be configured to capture the first signal 110 (such as the first audio signal) generated by the component (such as the engine 108) of the motorcycle 106 when the mobile communication device 102 is in proximity to the motorcycle 106. Examples of the audio capturing device 104a may include, but are not limited to, an electret microphone, a dynamic microphone, a carbon microphone, a piezoelectric microphone, a fiber microphone, a (micro-electro-mechanical-systems) MEMS microphone, or other microphones known in the art.

The vibration capturing device 104b may comprise suitable logic, circuitry, interfaces, and/or code that may be configured to capture the first signal 110 (such as the first vibration signal) generated by the component (such as the engine 108) of the motorcycle 106 when the mobile communication device 102 is physically in-contact with the motorcycle 106. The vibration capturing device 104b may have a high sampling rate (for example in KHz) to precisely sample or capture a variety of vibration patterns. The high-sampling rate of the vibration capturing device 104b may allow unique identification of different vibration sources or situations based on the capture of different vibration patterns generated by the vibration sources or situations. Examples of the vibration capturing device 104b may include, but are not limited to, an accelerometer, a gyroscope sensor, a tilt sensor, or other vibration sensing systems known in the art.

In FIG. 1, the mobile communication device 102 includes one audio capturing device 104a and one vibration capturing device 104b. However, the disclosure may not be so limited and in some embodiments, the mobile communication device 102 may include multiple in-built audio capturing devices and vibration capturing devices, without a deviation from scope of the disclosure.

The motorcycle 106 may be a two-wheeler or a three-wheeler vehicle. The motorcycle 106 may be an autonomous motorcycle, a semi-autonomous motorcycle, or a non-autonomous motorcycle. Examples of the motorcycle 106 may include, but are not limited to, an electric motorcycle, a hybrid motorcycle, a gas-combustion motorcycle, and/or a motorcycle with autonomous drive capability that uses one or more distinct renewable or non-renewable power sources. A motorcycle that uses renewable or non-renewable power sources may include a fossil fuel-based motorcycle, an electric propulsion-based motorcycle, a hydrogen fuel-based motorcycle, a solar-powered motorcycle, and/or a motorcycle powered by other forms of alternative energy sources.

It may be noted that the motorcycle 106 shown in FIG. 1 is merely an example of a two-wheeler vehicle. The present disclosure may be also applicable to other types of motorcycles or two-wheelers, such as a scooter. A description of other types and related components of the motorcycle 106 has been omitted from the disclosure for the sake of brevity.

The engine 108 may be configured to provide power to the motorcycle 106. The engine 108 may be an internal combustion engine with may include operations, for example, fuel injection, compression, ignition, emission to power and drive the motorcycle 106. The engine 108 may include various parts, for example, but are not limited to, a crankshaft, a cylinder, a spark plug, a piston, camshaft, a valve, combustion chamber, etc. In some embodiments, the engine 108 may include a motor in case of an electric motorcycle. The engine 108 may be two-stroke or four-stroke internal combustion engines. The engine 108 may include either one, two, three, four, or six cylinders. Examples of the engine 108 may include, but are not limited to, an inline engine (i.e. single cylinder, parallel twin, inline-triple, inline-four, inline-six), a V layout engine (i.e. V-twin engine, a V4 engine, a V8 engine), a flat (boxer) engine (i.e. flat-two, flat-four, flat-six), a lawn mower engine, a snow blower engine, or other motorcycle engines known in the art. A description of various parts of the engine 108 has been omitted from the disclosure for the sake of brevity.

The network 112 may include a communication medium through which the mobile communication device 102 may communicate with different parts (for example an electronic control unit (ECU), one or more in-built sensors, etc) of the motorcycle 106 and with the diagnostic server 114. Examples of the network 112 may include, but are not limited to, the Internet, a cloud network, a Long Term Evolution (LTE) network, a Wireless Local Area Network (WLAN), a Local Area Network (LAN), a telephone line (POTS), and/or a Metropolitan Area Network (MAN). Various devices in the network environment 100 may be configured to connect to the network 112, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, or Bluetooth (BT) communication protocols, or a combination thereof.

The diagnostic server 114 may comprise suitable logic, circuitry, interfaces, and/or code that may be configured to store vehicle information related to the motorcycle 106. The vehicle information may include, but is not limited to, identification information of the motorcycle 106, past diagnostic data, and troubleshooting instructions related to the motorcycle 106. The diagnostic server 114 may also store device information related to the mobile communication device 102 and user information related to the user 116. The user information may include identification information (for example name, contact details) of the user 116. The diagnostic server 114 may also store baseline information corresponding to a plurality of operational states of the motorcycle 106. The diagnostic server 114 may be configured to receive the first signal 110 captured by the mobile communication device 102 and provide tuning information and the troubleshooting instructions to the mobile communication device 102.

In accordance with an embodiment, the diagnostic server 114 may be a server of a service center related to the motorcycle 106. In some embodiments, the diagnostic server 114 may be server of a manufacturer of the motorcycle 106. In some embodiments, the diagnostic server 114 may be implemented as a cloud server, which may be utilized to execute aforementioned operations of the diagnostic server 114 through web applications, cloud applications, HTTP requests, repository operations, file transfer, gaming operations, and the like. Other examples of the server include, but are not limited to a database server, a file server, a web server, an application server, a mainframe server, or other types of server.

In operations, the mobile communication device 102 may be configured to receive a trigger input to initiate capture of diagnostic data of the motorcycle 106. The trigger input may be a user input from the user 116. In some embodiments, the trigger input may be a detection of proximity between the mobile communication device 102 and the motorcycle 106. In some embodiments, the trigger input may be a detection of physical contact between the mobile communication device 102 and the motorcycle 106 such that vibration produced by the motorcycle 106 (or the engine 108) can be detected by the mobile communication device 102. The mobile communication device 102 may be further configured to control the plurality of sensing devices 104 to capture a first signal 110 over a period of time based on the received trigger input. The plurality of sensing devices 104 may include the audio capturing device 104a and the vibration capturing device 104b. The mobile communication device 102 may be configured to control the audio capturing device 104a to capture a first audio signal (as the first signal 110) of a component of the motorcycle 106. In some embodiments, the mobile communication device 102 may be configured to control the vibration capturing device 104b to capture a first vibration signal (as the first signal 110) of the component of the motorcycle 106 when the mobile communication device 102 is physically in-contact with a surface of the motorcycle 106. The component may be the engine 108 of the motorcycle 106. The first signal 110 may be a sound or vibration produced or generated by the engine 108 of the motorcycle 106 when the engine 108 may be started. Thus, the trigger input may be a detection of start of the engine 108.

The sound may correspond to a vibration pattern produced or generated by the engine 108 of the motorcycle 106 when the engine 108 may be out-of-tune or not tuned properly. The first signal 110 (i.e. first audio signal or first vibration signal) may be produced by the engine 108 in a first operational state of the plurality of operational states of the motorcycle 106. Examples of the plurality of operational states may include, but are not limited to, a start of the engine in a neural gear, a particular gear of the motorcycle 106, a particular rotation per minute (RPM) range of the engine 108, an acceleration state from one speed range into another higher speed range, an deacceleration state from one speed range into another lower speed range, or a particular throttle position of the motorcycle 106.

The mobile communication device 102 may be further configured to extract one or more parameters from the captured first signal 110. The one or more parameters may include one or more audio parameters. Examples of the one or more audio parameters may include, but are not limited to, an amplitude, loudness, a frequency, a pitch, or direction-of-arrival (DOA) 230 of the first audio signal. The one or more parameters may further include one or more vibration parameters. Examples of the one or more vibration parameters may include, but are not limited to, an amplitude or a frequency of the first vibration signal.

The first audio signal or the first vibration signal may have different level of the one or more audio/vibration parameters for different operational states of the motorcycle 106. Details of the one or more audio/vibration parameters and the plurality of operational states are described in detail, for example, in FIGS. 3 and 4. The mobile communication device 102 may be further configured to store baseline information for the plurality of operational states. The baseline information may indicate a range of baseline values for each of the plurality of operational states of the motorcycle 106. The range of baseline values indicate a range of levels of the audio or vibration parameters within which the engine 108 may be working or tuned properly. For example, during start of the engine in a neutral gear and zero throttle position (as an operational state), the range of amplitude levels of expected sound of the engine 108 may be 40 dB to 60 dB as the baseline information.

The mobile communication device 102 may be further configured to detect a deviation between the extracted one or more parameters and the stored baseline information for the first operational state (i.e. current operational state). The detected deviation may indicate tuning information associated with the component (e.g. engine 108) of which the first signal 110 was captured. The tuning information may indicate information whether the engine 108 is in-tune or out-of-tune. For example, in case the extracted parameter (audio or vibration) of the first signal 110 of the engine 108 is within the range of baseline values for the first operational state, then the engine 108 may be in-tune or functioning correctly. On the contrary, the engine 108 may be out-of-tune or not functioning correctly. The tuning information may also indicate a degree at which the component (e.g. engine 108) may be out-of-tune, for example, how much percentage the engine 108 is out-of-tune. The tuning information is described in detail, for example, in FIG. 4.

The mobile communication device 102 may be further configured to output the tuning information based on the determination that the detected deviation is out of the range of baseline values for the first operational state of the motorcycle 106. The mobile communication device 102 may be configured to output the tuning information through one of a display screen or a sound reproduction device (for example speaker) associated with the mobile communication device 102. The output tuning information may indicate the user 116 (for example rider) that the engine 108 or the motorcycle 106 is in-tune or out-of-tune in a particular operational state. In some embodiments, the tuning information may include one or more troubleshooting instructions to minimize the deviation between the extracted one or more parameters and the baseline information. Thus, the mobile communication device 102 may efficiently monitor the first signal 110 (or tuning status) of the engine 108 through in-built the audio capturing device 104a and the vibration capturing device 104b without using conventional diagnostic tools which connect with the engine 108 using standard cables and measure the diagnostic data from in-built sensors of the motorcycle 106. Further, the mobile communication device 102 may provide different troubleshooting instructions to the user 116 or to the engine 108 to minimize the deviation or bring the engine 108 from an out-of-tune state to an in-tune state. The troubleshooting instructions are described in detail, for example, in FIG. 4A.

Figure 2:
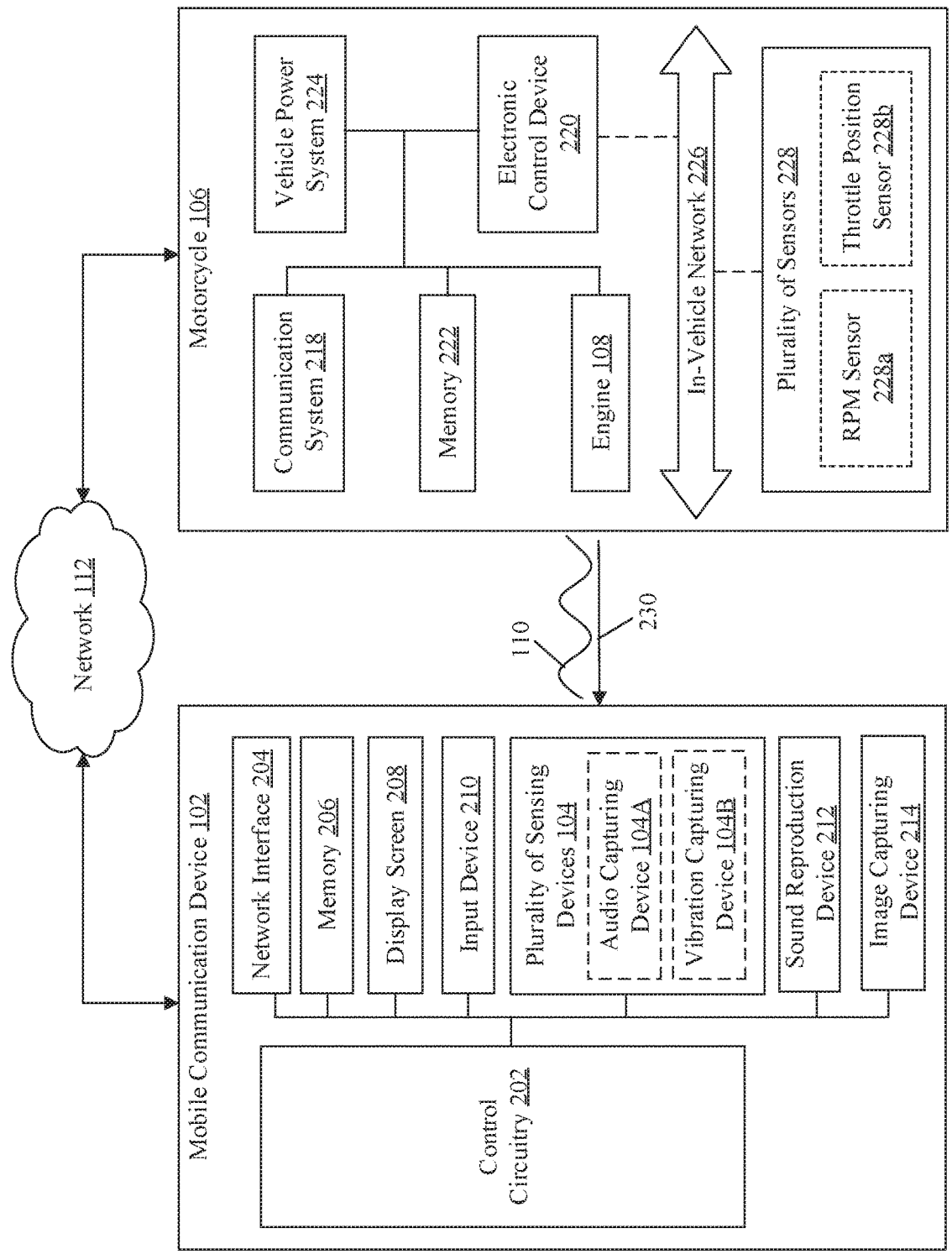
FIG. 2 is a block diagram that illustrates an exemplary mobile communication device to provide tuning assistance for a motorcycle, in accordance with an embodiment of the disclosure.

FIG. 2 is a block diagram that illustrates an exemplary mobile communication device to provide tuning assistance for a motorcycle, in accordance with an embodiment of the disclosure. FIG. 2 is explained in conjunction with elements from FIG. 1. With reference to FIG. 2, there is shown the mobile communication device 102. The mobile communication device 102 may include control circuitry 202, a network interface 204, a memory 206, a display screen 208, an input device 210, the audio capturing device 104a, the vibration capturing device 104b, a sound reproduction device 212, and an image capturing device 214. The control circuitry 202 may be connected with the network interface 204, the memory 206, the display screen 208, the input device 210, the audio capturing device 104a, the vibration capturing device 104b, the sound reproduction device 212, and the image capturing device 214 through wired or wireless connections.

In FIG. 2, there is further shown a block diagram of the motorcycle 106. The motorcycle 106 may include the engine 108, a communication system 218, an electronic control device (ECD) 220, a memory 222, a vehicle power system 224, an in-vehicle network 226, a plurality of sensors 228. The plurality of sensors may include a rotation per minute (RPM) sensor 228a and a throttle position sensor 228b. The communication system 218, the electronic control device ECD 220, the engine 108, the memory 222, the vehicle power system 224, and the plurality of sensors 228 are connected to each other through the in-vehicle network 226. The mobile communication device 102 and the motorcycle 106 may communicate with each other through the network 112 via the network interface 204, and the communication system 218.

The control circuitry 202 may comprise suitable logic, circuitry, interfaces, and/or code that may be configured to execute a set of instructions stored in the memory 206. The control circuitry 202 may be configured to control the network interface 204, the memory 206, the display screen 208, the input device 210, the audio capturing device 104a, the vibration capturing device 104b. The sound reproduction device 212, and the image capturing device 214 to perform different operations based on the set of instructions. The control circuitry 202 may be configured to control the input device 210 to receive the trigger input. The control circuitry 202 may be configured to control the audio capturing device 104a and the vibration capturing device 104b, based on the received trigger input, to capture the first audio signal and the first vibration signal produced by the engine 108 of the motorcycle 106.

The control circuitry 202 may be configured to retrieve the baseline information for the first operational state from the memory 206 or from the diagnostic server 114. The control circuitry 202 may be further configured to detect the deviation between the one or more parameters of the captured first signal 110 and the baseline information. The control circuitry 202 may be further configured to output the tuning information to one of the display screen 208 and the sound reproduction device 212 (for example speaker) for the user 116 based on the detected deviation. The control circuitry 202 may be further configured to communicate with the motorcycle 106 through the network interface 204. In some embodiments, the control circuitry 202 may be configured to transmit the tuning information to the electronic control device (ECD) 220 of the motorcycle 106 through the network 112. In another embodiment, the control circuitry 202 may be configured to transmit the tuning information to the diagnostic server 114 through the network interface 204 and the network 112. The control circuitry 202 may be implemented based on a number of processor technologies known in the art. Examples of the control circuitry 202 may include a Graphical Processing Unit (GPU), a Central Processing Unit (CPU), an x86-based processor, an x64-based processor, a Reduced Instruction Set Computing (RISC) processor, an Application-Specific Integrated Circuit (ASIC) processor, a Complex Instruction Set Computing (CISC) processor, and/or other hardware processors.

The network interface 204 may comprise suitable logic, circuitry, interfaces, and/or code that may be configured to enable communication between the control circuitry 202 and the diagnostic server 114 or the communication system 218 of the motorcycle 106 via the network 112. The network interface 204 may implement by use of various known technologies to support wired or wireless communication of the mobile communication device 102 with the network 112. The network interface 204 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer.

The memory 206 may comprise suitable logic, circuitry, interfaces, and/or code that may be configured to store a set of instructions executable by the control circuitry 202. The memory 206 may store the baseline information for each of the plurality of operational states for the motorcycle 106. The memory 206 may also store the device information related to the mobile communication device 102 and the user information related to the user 116. The memory 206 may be configured to store the captured first audio signal, the captured first vibration signal, and the tuning information calculated by the control circuitry 202. Examples of implementation of the memory 206 may include, but are not limited to, Random Access Memory (RAM), Read Only Memory (ROM), Hard Disk Drive (HDD), a Solid-State Drive (SSD), a CPU cache, and/or a Secure Digital (SD) card.

The display screen 208 may comprise suitable logic, circuitry, interfaces, and/or code that may be configured to render various types of information to the user 116. The display screen 208 may present a user interface for the user 116 to receive the trigger input from the user 116. The display screen 208 may be configured to display the tuning information output by the control circuitry 202. Examples of implementations of the display screen 208 may include a liquid crystal display (LCD), and a light emitting diode (LED) display, a plasma display, and an Organic LED (OLED) display, and other displays.

The input device 210 may comprise suitable logic, circuitry, interfaces, and/or code that may be configured to receive one or more user inputs (for example trigger input) from the user 116. The input device 210 may further configured to provide the one or more user inputs to the control circuitry 202 to further control the plurality of operations of the mobile communication device 102. Examples of the one or more user inputs may include, but are not limited to, a voice input, a gesture input, a touch input, and a text input. Examples of the input device 210 may include, but are not limited to, a touchscreen interface, a touch pad, a keyboard, a microphone, a camera, and a computer mouse.

The sound reproduction device 212 may comprise suitable logic, circuitry, interfaces, and/or code that may be configured to generate an audio output based on the output tuning information. The audio output may be used to alert the user 116 whether the engine 108 is in-tune or out-of-tune based on the output tuning information. The audio output may be a prestored audible message for the user 116 based on the output tuning information. The prestored message may be stored in the memory 206 or retrieved from the diagnostic server 114 for the motorcycle 106. Examples of the sound reproduction device 212 may include, but are not limited to, a loudspeaker, a full-range speaker, a mid-range speaker, a headphone, a woofer, a subwoofer, a coaxial speaker, a monitor speaker, and a tweeter.

The image capturing device 214 may comprise suitable logic, circuitry, interfaces, and/or code that may be configured to capture one or more images of the motorcycle 106 in proximity to the mobile communication device 102. The one or more images captured by the image capturing device 214 and a tilt of the mobile communication device 102 detected by the vibration capturing device 104b may be used to detect a position of the mobile communication device 102 with respect to a position of the motorcycle 106 to confirm the proximity between the mobile communication device 102 and the motorcycle 106. Examples of the image capturing device 214 may include, but are not limited to, an image sensor, a charge coupled device (CCD), a camera, a webcam, or an image device known in the art.

The mobile communication device 102 may include another component as well to perform different functions of the mobile communication device 102. The description of the other components of the mobile communication device 102 has been omitted from the disclosure for the sake of brevity.

The communication system 218 may comprise suitable logic, circuitry, interfaces, and/or code that may be configured to communicate diagnostic data associated with the motorcycle 106 with the mobile communication device 102 and the diagnostic server 114, through the network 112. The communication system 218 may be implemented by use of various known technologies to support wired or wireless communication of the motorcycle 106 with the network 112. The communication system 218 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and a local buffer.

The electronic control device (ECD) 220 may be a specialized electronic circuitry that may include an electronic control unit (ECU) processor to control different functions, such as, but not limited to, engine operations, communication operations, and data acquisition from the plurality of sensors 228 of the motorcycle 106. The electronic control device (ECD) 220 may be configured to control the plurality of sensors 228 (such as RPM sensor 228a and the throttle position sensor 228b) to acquire the diagnostic data (e.g. RPM data of the engine 108 and the throttle position) through the in-vehicle network 226. The electronic control device (ECD) 220 may be further configured to control the memory 222 to store the acquired diagnostic data. The electronic control device (ECD) 220 may be further configured to control the communication system 218 to transmit the acquired diagnostic data to the diagnostic server 114 or the mobile communication device 102 via the network 112. The electronic control device (ECD) 220 may be further configured to control the communication system 218 to receive the tuning information from the mobile communication device 102 through the network 112. The electronic control device (ECD) 220 may be further configured to auto-tune one or more parameters (i.e. described in detail in FIG. 4A) associated with the engine 108 of the motorcycle 106 based on the received tuning information. The tuning information may include one or more troubleshooting instructions to auto-tune the one or more parameters associated with the engine 108 and convert the out-of-tune status of the engine 108 to the in-tune status. In some embodiments, the electronic control device (ECD) 220 may retrieve the one or more troubleshooting instructions from the in-built memory 222.

The electronic control device (ECD) 220 may be a microprocessor. Other examples of the electronic control device (ECD) 220 may include, but are not limited to a microcontroller, a Reduced Instruction Set Computing (RISC) processor, an Application-Specific Integrated Circuit (ASIC) processor, a Complex Instruction Set Computing (CISC) processor, a microcontroller, a central processing unit (CPU), a graphics processing unit (GPU), a state machine, and/or other processors or circuits.

The memory 222 may comprise suitable logic, circuitry, interfaces, and/or code that may be configured to store a set of instructions executable by the electronic control device (ECD) 220. The memory 222 may store information related to the motorcycle 106. The information may include, but is not limited to, identification information (e.g. a model number) of the motorcycle 106, manufacturer information of the motorcycle 106, identification information (e.g. part number) of different components of the motorcycle 106. The memory 222 may store the diagnostic data measured by the plurality of sensors 228. In some embodiments, the memory 222 may be configured to store the tuning information and the one or more troubleshooting instructions received from the mobile communication device 102. Examples of implementation of the memory 222 may include, but are not limited to, Random Access Memory (RAM), Read Only Memory (ROM), Hard Disk Drive (HDD), a Solid-State Drive (SSD), a CPU cache, and/or a Secure Digital (SD) card.

The vehicle power system 224 may control electric power which may be output to various electric circuits and loads of the motorcycle 106. The vehicle power system 224 may include a battery (not shown) to provide the electric power to perform various electrical operations of the motorcycle 106. The vehicle power system 224 may provide the electric power for functioning of different components (such as the electronic control device (ECD) 220, the communication system 218, the memory 222, and the plurality of sensors 228) of the motorcycle 106.

The plurality of sensors 228 may comprise suitable logic, circuitry, interfaces, and/or code that may be configured to acquire the diagnostic data of the motorcycle 106. The plurality of sensors 228 may be configured to communicate the acquired diagnostic data to the electronic control device (ECD) 220 or the communication system 218 through the in-vehicle network 226. The plurality of sensors 228 may include a rotation per minute (RPM) sensor 228a and a throttle position sensor 228b. The RPM sensor 228a may be configured to measure the RPM of the engine 108. The throttle position sensor 228b may be configured to measure a throttle position (i.e. opening degree) of a throttle valve of the engine 108 based on acceleration/deacceleration performed by an accelerator of the motorcycle 106. The measured RPM data and the throttle position data may be used by the electronic control device (ECD) 220 as the diagnostic data. The motorcycle 106 may include various other types of sensors to measure different parameters (for example temperature, geo-location, vibration, fuel level, gear position, lean angle, pressure, etc.) of the motorcycle 106. The description of the other types of sensors of the motorcycle 106 has been omitted from the disclosure for the sake of brevity.

Figure 3:
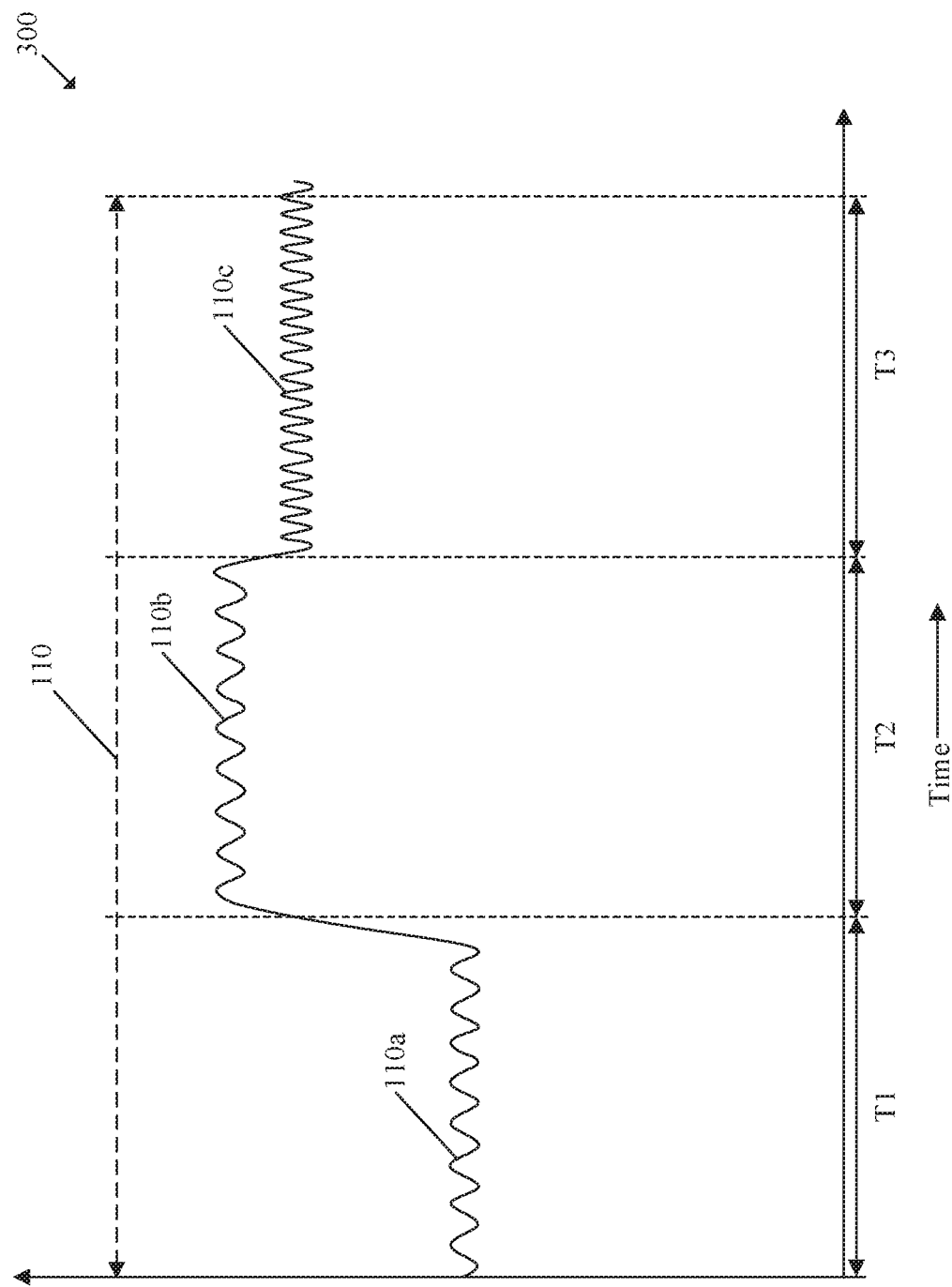
FIG. 3 illustrates an exemplary signal captured by plurality of sensing devices of the mobile communication device of FIG. 2, in accordance with an embodiment of the disclosure.

FIG. 3 illustrates an exemplary signal captured by plurality of sensing devices of the mobile communication device of FIG. 2, in accordance with an embodiment of the disclosure. FIG. 3 is explained in conjunction with elements from FIGS. 1 and 2. With reference to FIG. 3, there is shown the first signal 110 captured by the plurality of sensing devices 104 of the mobile communication device 102. The first signal 110 shown in FIG. 3 may be the first audio signal captured by the audio capturing device 104a or may be the first vibration signal captured by the vibration capturing device 104b. The mobile communication device 102 may be configured to control the audio capturing device 104a and the vibration capturing device 104b to capture the first audio signal and the first vibration signal over a period of time respectively. The period of time may vary from few seconds to certain hours. The first audio signal (as the first signal 110) may correspond to a sound produced or generated by a component (for example the engine 108) of the motorcycle 106. In some embodiments, the first signal 110, as the first vibration signal, may correspond to a vibration pattern produced by the component (e.g. the engine 108) of the motorcycle 106. The first audio signal or the first vibration signal may be the sound or the vibration produced by the engine 108 when the motorcycle 106 is in-tune or out-of-tune. In case, the motorcycle 106 or the engine 108 is in-tune, then the audio or vibration parameters of the captured first signal 110 are within the range of baseline values predefined for the first operational state corresponding to the first signal 110. On the other hand, in case the motorcycle 106 or the engine 108 is out-of-tune, then the audio/vibration parameters of the captured first signal 110 are out of the range of baseline values predefined for the first operational state corresponding to the first signal 110.

With respect to FIG. 3, the captured first signal 110 may include a first audio/vibration part 110a of the first signal 110. The first audio/vibration part 110a may be captured over a first period of time T1 and may correspond to a first operational state of the motorcycle 106. For example, the first operational state may be a state at which the engine 108 may be running at a particular RPM with zero throttle position. The captured first signal 110 may further include a second audio/vibration part 110b captured over a second period of time T2. The second audio/vibration part 110b may correspond to a second operational state of the motorcycle 106 which may be different from the first operational. For example, the second operational state may be a state at which the engine 108 may be running at a particular RPM with 25% throttle position. For example, as shown in FIG. 3, a first average amplitude or a first amplitude peak of the first audio/vibration part 110a (during the first operational state) may be lower than a second average amplitude or a second amplitude peak of the second audio/vibration part 110b (during the second operational state) considering higher RPM and the throttle position in the second operational state than in the first operational state of the motorcycle 106.

With respect to FIG. 3, the first signal 110 may include a third audio/vibration part 110c in a third operational state of the motorcycle 106. The third audio/vibration part 110c may be captured over a third period of time T3. For example, as shown in FIG. 3, a frequency of the third audio/vibration part 110c may be higher than the frequency of the first audio/vibration part 110a and the second audio/vibration part 110b. FIG. 3 may indicate exemplary level of audio/vibration parameters (e.g. amplitude, frequency) of the first audio/vibration part 110a, the second audio/vibration part 110b, and the third audio/vibration part 110c for a particular engine of a motorcycle. Different motorcycles and engines may produce the first signal 110 with different levels of the audio/vibration parameters. The details of the audio/vibration parameters for different motorcycles and respective engines have been omitted from the disclosure for the sake of brevity.

Figure 4A:
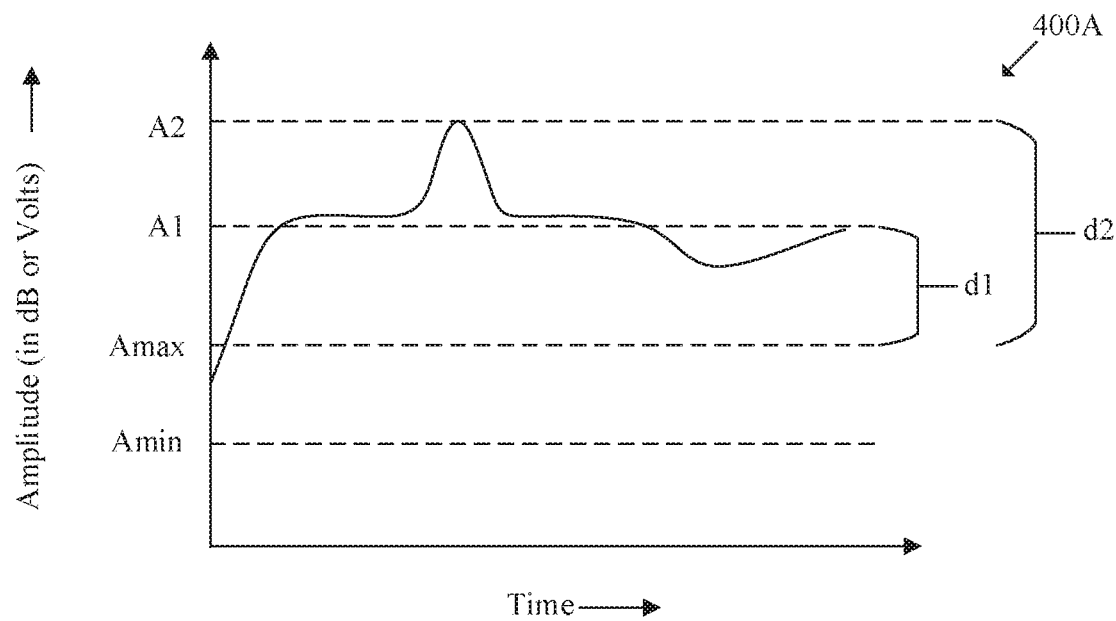
FIG. 4A illustrates a first exemplary scenario to depict baseline information and signal captured in a first operational state of a motorcycle, in accordance with an embodiment of the disclosure.

FIG. 4A illustrates a first exemplary scenario to depict baseline information and signal captured in a first operational state of a motorcycle, in accordance with an embodiment of the disclosure. FIG. 4A is explained in conjunction with elements from FIGS. 1, 2, and 3. With reference to FIG. 4A, there is shown an amplitude-time distribution 400A of the first audio/vibration part 110a of the first signal 110 captured over the period of time T1. The captured first audio/vibration part 110a may correspond to the first operational state of the engine 108 of the motorcycle 106. There is also shown first baseline information corresponding to the first operational state. The first baseline information may indicate a first range of baseline values for the first operational state. For example, the first range of baseline values may indicate a range of amplitude levels denoted with Amax and Amin as the baseline values for the first operational state of the engine 108. The range of amplitude levels (Amax-Amin) may indicate the range of sound/vibration levels produced by the engine 108 when the engine 108 is correctly tuned. Thus, in case the captured first audio/vibration part 110a indicates the amplitude level (as audio//vibration parameter) within the range of amplitude levels (Amax-Amin), then the engine 108 or the motorcycle 106 is in-tune.

The control circuitry 202 may be configured to control the audio capturing device 104a and/or the vibration capturing device 104b to capture the first audio part (e.g. sound) and/or the first vibration part (e.g. vibration) generated by the component (for example the engine 108) of the motorcycle 106 over the first period of time T1. In some embodiments, the control circuitry 202 may be configured to control the audio capturing device 104a and the vibration capturing device 104b to capture the first audio/vibration part 110a based on the trigger input. Examples of the trigger input may include, but are not limited to, a user input received via the input device 210, a proximity between the mobile communication device 102 and the motorcycle 106, detection of a start of the engine 108, detection of an acceleration state of the motorcycle 106 from a particular speed to a higher speed, detection of a deacceleration state of the motorcycle 106 from a particular speed to a lower speed, detection of a particular RPM of the engine 108, or detection of a particular throttle position of the motorcycle 106. In some embodiments, the control circuitry 202 may be configured to control the audio capturing device 104a or the vibration capturing device 104b to capture the first audio/vibration part 110a based on an input provided by an application running on the mobile communication device 102. The application may be running as a background application on the mobile communication device 102.

The control circuitry 202 may be further configured to extract the one or more audio/vibration parameters from the captured first audio/vibration part 110a. With respect to FIG. 4A, the control circuitry 202 may extract the amplitude level from the captured first audio/vibration part 110a, as the audio or vibration parameter. In some embodiments, the control circuitry 202 may be configured to determine an average amplitude level of the first audio/vibration part 110a over the period of time T1. In another embodiment, the control circuitry 202 may determine an amplitude peak of the first audio/vibration part 110a during the period of time T1. The extract amplitude level of the first audio/vibration part 110a may correspond to the first operational state of the motorcycle 106, as described in FIG. 3 as example. The control circuitry 202 may determine the first operational state from a plurality of operational states of the motorcycle 106 based on the extracted one or more audio/vibration parameters of the first audio/vibration part 110a. For example, as shown in FIG. 4A, the average amplitude (e.g. denoted as A1) or the amplitude peak (e.g. denoted by A2) may indicate that the motorcycle 106 or the engine 108 may be in the first operational state. The first operational state may indicate a particular RPM of the engine 108 and/or a particular throttle position of the motorcycle 106 as described in FIG. 3. Thus, the mobile communication device 102 may also monitor the RPM of the engine 108 and/or the throttle position of the motorcycle 106 based on the first audio/vibration part 110a captured over the period of time T1. In some embodiments, the control circuitry 202 may be configured to determine the first operational state from the plurality of operational states of the motorcycle 106 based on the one or more audio parameters extracted from the first audio signal and the one or more vibration parameters extracted from the first vibration signal.

The control circuitry 202 may be configured to determine the first baseline information corresponding to the first operational state determined from the plurality of operational states of the motorcycle 106. The first baseline information for the first operational state may indicate the first range of baseline values (for example range of amplitude levels Amax-Amin of sound/vibration produced by the engine 108) within which the motorcycle 106 or the engine 108 is tune correctly.

In some embodiments, the control circuitry 202 may be configured to determine the first operational state from the plurality of operational states of the motorcycle 106 based on the diagnostic data or sensor data received from the electronic control device (ECD) 220 of the motorcycle 106, via the network 112. The diagnostic or sensor data may be the RPM of the engine 108 captured by the RPM sensor 228a or the throttle position captured by the throttle position sensor 228b. For example, 1000 RPM of the engine 108 and zero throttle position may refer to the first operational state. In some embodiments, based on the receipt of the trigger input, the control circuitry 202 of the mobile communication device 102 may be configured to communicate with the electronic control device (ECD) 220 of the motorcycle 106 to receive the diagnostic data. The control circuitry 202 may communicate with the electronic control device (ECD) 220 (through the network interface 204) at a predefined time interval to receive the diagnostic data.

The control circuitry 202 may be further configured to retrieve the first range of baseline values from the memory 206 or the diagnostic server 114 based on the determination of the first operational state and the corresponding first baseline information. In some embodiments, the control circuitry 202 may be configured to determine the first range of baseline values from a stored plurality of predefined baseline ranges corresponding to the plurality of operational states of the motorcycle 106.

The control circuitry 202 may be further configured to detect a deviation between the extracted amplitude level of the captured first audio/vibration part 110a and the retrieve the first range of baseline values for the determined first operational state (i.e. current operational state). With respect to FIG. 4A, there is shown a first deviation (represented by d1) between the average amplitude A1 of the first audio/vibration part 110a and a maximum amplitude level Amax of the first range of baseline values. There is further shown a second deviation (represented by d2) between the amplitude peak A2 of the first audio/vibration part 110a and the maximum amplitude level Amax of the first range of baseline values. The deviation (d1 or d2) may indicate that the captured amplitude level (in dB) of the first audio/vibration part 110a is out-of-range with respect to the first range of baseline values (Amax-Amin) for the first operational state. The detected deviation (d1 or d2) may also indicate that the engine 108 or the motorcycle 106 is out-of-tune.

The control circuitry 202 may be further configured to generate tuning information based on the detected deviation (d1 or d2). The tuning information may indicate the detected deviation (for example in dB for amplitude as audio parameter or in volts for amplitude as vibration parameter). In case of extraction of the frequency as audio/vibration parameter from the first audio/vibration part 110a, the detected deviation may in Hz or KHz as described in FIG. 4B. In some embodiments, the deviation may indicate a degree at which the component (or the engine 108) of the motorcycle 106 is out-of-tune. For example, in case of 10% deviation between the amplitude of the first audio/vibration part 110a and the maximum level Amax of the range of baseline values for the determined first operational state, the engine 108 or the motorcycle 106 may be 10% out-of-tune. Different factors for out-of-tune of the motorcycle 106 may be, but are not limited to, improper ignition, spark plug timing, low lubrication oil level, idle speed set too high, in-effective cooling, or damaged components of the motorcycle 106. In case, the extracted amplitude level of the captured first audio/vibration part 110a is within the first range of baseline values (Amax-Amin), or the detected deviation is negative, then the tuning information may indicate that the engine 108 or the motorcycle 106 is in-tune or correctly tuned.

The control circuitry 202 may be further configured to output the generated tuning information through the display screen 208 or the sound reproduction device 212 (for example speaker) of the mobile communication device 102. Thus, based on the detection of the out-of-tune state (as the detected deviation), the mobile communication device 102 may alert the user 116 (for example the rider of the motorcycle 106 or a person who measures the sound of the motorcycle 106 using the mobile communication device 102). Therefore, the mobile communication device 102 may allow the user 116 to efficiently measure the sound or vibration generated by the engine 108 or the motorcycle 106 and receive appropriate notification about in-tune or out-of-tune status of the motorcycle 106 from the mobile communication device 102. In some embodiments, the control circuitry 202 may be further configured to control the display screen to display the extracted one or more audio/vibration parameters (for example amplitude, frequency) of the captured first signal 110. In another embodiment, the control circuitry 202 may be further configured to control the display screen to display the baseline information (i.e. range of baseline values) corresponding to the detected current operational state of the motorcycle 106.

In some embodiments, the control circuitry 202 may be further configured to control the network interface 204 to transmit the generated tuning information to the electronic control device (ECD) 220 of the motorcycle 106. The electronic control device (ECD) 220 may receive the tuning information, via the communication system 218 of the motorcycle 106. The electronic control device (ECD) 220 may utilize the received tuning information to perform different auto-tuning operations of one or more parameters of the engine 108 or the motorcycle 106 to convert the out-of-tune status to the in-tune status. Examples of the auto-tuning operations may include, but are not limited to, throttle position adjustment, fuel pump injection timing adjustment, spark timing adjustment, correction of electrical issues, adjustment of air-fuel ratio, carburetor balance, RPM adjustment, etc.

In some embodiments, the transmitted tuning information may include one or more troubleshooting instructions for the electronic control device (ECD) 220 to perform the auto-tuning operations. The one or more troubleshooting instructions may provide the assistance to the electronic control device (ECD) 220 to minimize the detected deviation (d1 or d2) or to convert the current out-of-tune status to the in-tune status of the motorcycle 106. For example, the one or more trouble shooting instructions may include text or audible message to be rendered on an input/output device (for example screen or speaker) of the motorcycle 106. The text or audible message may be an alert to visit nearby authorized service center to get the motorcycle 106 auto-tuned, resolve different problems, or get the motorcycle 106 serviced. In some embodiments, the one or more troubleshooting instructions may include details of different parts in the motorcycle 106 or in the engine 108 to be replaced. In such case, the troubleshooting instructions may include details (for example address, website URL) of a vendor or distributer from whom the different parts can be replaced. In another embodiment, the one or more troubleshooting instructions may include different diagnostic software programs used by the electronic control device (ECD) 220 for auto-tuning. The one or more troubleshooting instructions may include different URL which can be accessed by the electronic control device (ECD) 220 to download updated diagnostic programs from the diagnostic server 114.

In some embodiments, the control circuitry 202 may directly receive the one or more troubleshooting instructions from the diagnostic server 114 based on the tuning information. In such case, the control circuitry 202 may be configured to transmit the generated tuning information to the diagnostic server 114, via the network 112. The control circuitry 202 may be further configured to transmit first identification information of the engine 108 (for example part number or details of different parts in the engine 108) and second identification information of the motorcycle 106 (for example model number) to the diagnostic server 114. The diagnostic server 114 may analyze the received tuning information (for example degree of out-of-tune), the first identification information of the engine 108, and the second identification information of the motorcycle 106, and provide the one or more prestored troubleshooting instructions to the control circuitry 202, via the network 112, based on the analysis. The diagnostic server 114 may be a server associated with a service center of the motorcycle 106. The diagnostic server 114 may be a server associated with a manufacturer of the motorcycle 106. In some embodiments, the control circuitry 202 may receive the one or more troubleshooting instructions from the user 116 through input device 210.

Figure 4B:
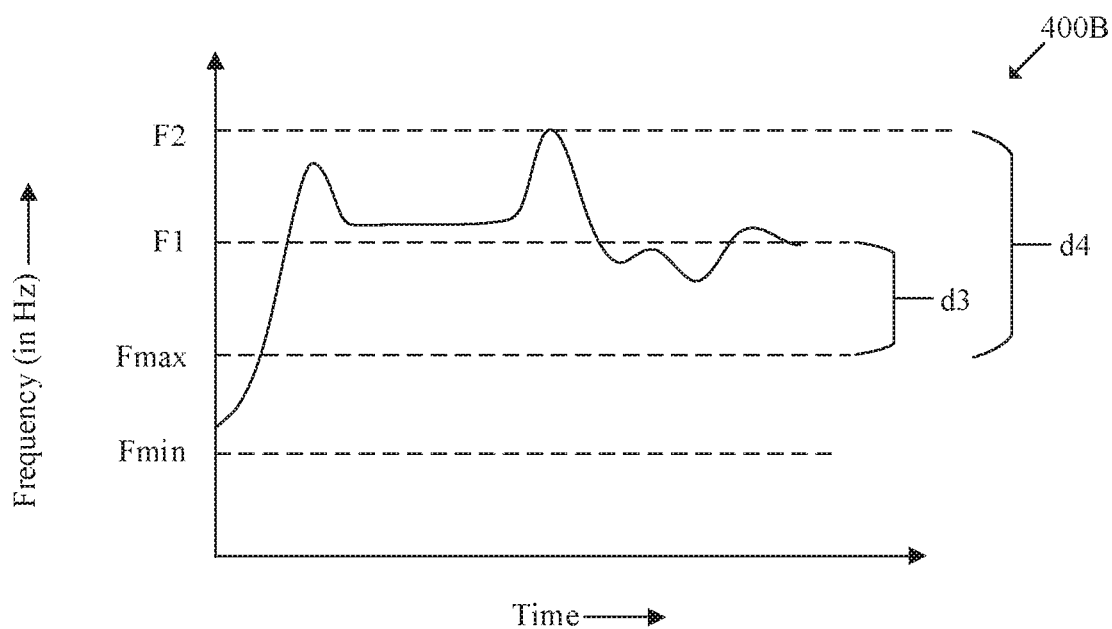
FIG. 4B illustrates a second exemplary scenario to depict baseline information and signal captured in a second operational state of a motorcycle, in accordance with an embodiment of the disclosure.

FIG. 4B illustrates a second exemplary scenario to depict baseline information and signal captured in a second operational state of a motorcycle, in accordance with an embodiment of the disclosure. FIG. 4B is explained in conjunction with elements from FIGS. 1, 2, 3, and 4A. With reference to FIG. 4B, there is shown a frequency-time distribution 400B of the second audio/vibration part 110b of the first signal 110 captured over a period of time T2. The captured second audio/vibration part 110b may correspond to the second operational state, different from the first operational state described in FIGS. 3 and 4A. There is also shown second baseline information corresponding to the second operational state. The second baseline information may indicate a second range of baseline values for the second operational state. For example, the second range of baseline values may indicate a range of frequency levels denoted with Fmax and Fmin (in Hz) as the baseline values for the second operational state of the engine 108. The range of frequency Fmax-Fmin may indicate the frequency range of sound or vibration produced by the engine 108 when the engine 108 is correctly tuned. Thus, in case the captured second audio/vibration part 110b indicates the frequency level (as audio or vibration parameter) within the range of frequency levels Fmax-Fmin, then the engine 108 or the motorcycle 106 is in-tune.

The control circuitry 202 may be configured to control the audio capturing device 104a and the vibration capturing device 104b to capture the second audio/vibration part 110b generated by the component (for example the engine 108) of the motorcycle 106 over the second period of time T2 based on the trigger input. The control circuitry 202 may be further configured to extract the one or more audio parameters and the one or more vibration parameters from the captured second audio/vibration part 110b. With respect to FIG. 4B, the control circuitry 202 may extract the frequency levels from the captured second audio/vibration part 110b, as the audio or vibration parameter. The control circuitry 202 may be configured to execute fourier transformation (for example Fast fourier transformation (FFT), Discrete fourier transformation (DFT)) on the captured second audio/vibration part 110b to extract the frequency levels from the captured second audio/vibration part 110b. The detailed implementation of the fourier transformation technique may be known to one skilled in the art, and therefore, a detailed description for the fourier transformation techniques has been omitted from the disclosure for the sake of brevity.

In some embodiments, the control circuitry 202 may be configured to determine an average frequency level of the second audio/vibration part 110b over the second period of time T2. In another embodiment, the control circuitry 202 may determine a frequency peak of the second audio/vibration part 110b during the period of time T2. The control circuitry 202 may determine the second operational state from the plurality of operational states of the motorcycle 106 based on the extracted one or more audio/vibration parameters of the second audio/vibration part 110b. For example, as shown in FIG. 4B, the average frequency (e.g. denoted as F1) or the frequency peak (e.g. denoted by F2) may indicate that the motorcycle 106 or the engine 108 may be in the second operational state. The control circuitry 202 may be further configured to determine the second baseline information corresponding to the second operational state determined from the plurality of operational states of the motorcycle 106. The second baseline information for the second operational state may indicate the second range of baseline values (for example range of frequency levels Fmax-Fmin of sound produced by the engine 108) within which the motorcycle 106 or the engine 108 is tune correctly. The control circuitry 202 may be further configured to retrieve the second range of baseline values (i.e. out of the stored plurality of predefined baseline ranges) from the memory 206 or the diagnostic server 114 based on the determination of the second operational state and the corresponding second baseline information.

The control circuitry 202 may be further configured to detect a deviation between the extracted frequency level of the captured second audio/vibration part 110b and the retrieved the second range of baseline values for the determined second operational state (i.e. current operational state). With respect to FIG. 4B, there is shown a third deviation (represented by d3) between the average frequency F1 of the second audio/vibration part 110b and a maximum frequency level Fmax of the second range of baseline values Fmax-Fmin. There is further shown a fourth deviation (represented by d4) between the frequency peak F2 of the second audio/vibration part 110b and the maximum frequency level Fmax of the second range of baseline values Fmax-Fmin. The deviation (d3 or d4) may indicate that the captured frequency level (in Hz or KHz) of the second audio part 110b is out-of-range with respect to the second range of baseline values (Fmax-Fmin) for the second operational state. The detected deviation (d3 or d4) may also indicate that the engine 108 or the motorcycle 106 is out-of-tune.

The control circuitry 202 may be further configured to generate the tuning information based on the detected deviation (d3 or d4). The tuning information may indicate the detected deviation (in Hz or KHz for frequency as audio or vibration parameter). In some embodiments, the deviation (for example F1-Fmax or F2-Fmax) may indicate a degree at which the component (or the engine 108) of the motorcycle 106 is out-of-tune. In case, the extracted frequency levels of the captured second audio/vibration part 110b is within the second range of baseline values (Fmax-Fmin), or the detected deviation is negative, then the tuning information may indicate that the engine 108 or the motorcycle 106 is in-tune or correctly tuned.

In accordance with an embodiment, the control circuitry 202 may be configured to determine the direction-on-arrival DOA (denoted by 230 in FIG. 2) of the first audio signal as the audio parameter. The control circuitry 202 may be configured to confirm that the captured first audio signal belongs to a target motorcycle 106 (of which sound has to be captured) based on the determined DOA 230. The control circuitry 202 may be configured to control the vibration capturing device 104b (i.e. accelerometer) to determine a tilt angle or orientation of the mobile communication device 102.

The control circuitry 202 may be further configured to analyze the determined tilt angle/orientation and the one or more images of the motorcycle 106 captured by the image capturing device 214 to determine whether the motorcycle 106 is in proximity (or in-contact) with the mobile communication device 102, and determine the position of the motorcycle 106 (or engine 108) with respect to the mobile communication device 102. Thus, the control circuitry 202 may determine the direction-on-arrival DOA of the first audio signal (i.e. sound produced by the engine 108) based on the tilt angle/orientation of the mobile communication device 102 and the one or more images of the motorcycle 106. In case, of presence of other sounds or ambient noises around the mobile communication device 102, the control circuitry 202 may execute noise cancellation process to suppress or attenuate the other sounds or ambient noises captured by the audio capturing device 104a. Thus, based on the determination of the DOA 230 and noise cancellation of the ambient noises, the mobile communication device 102 achieves capture of the first audio signal with higher accuracy.

Figure 5:
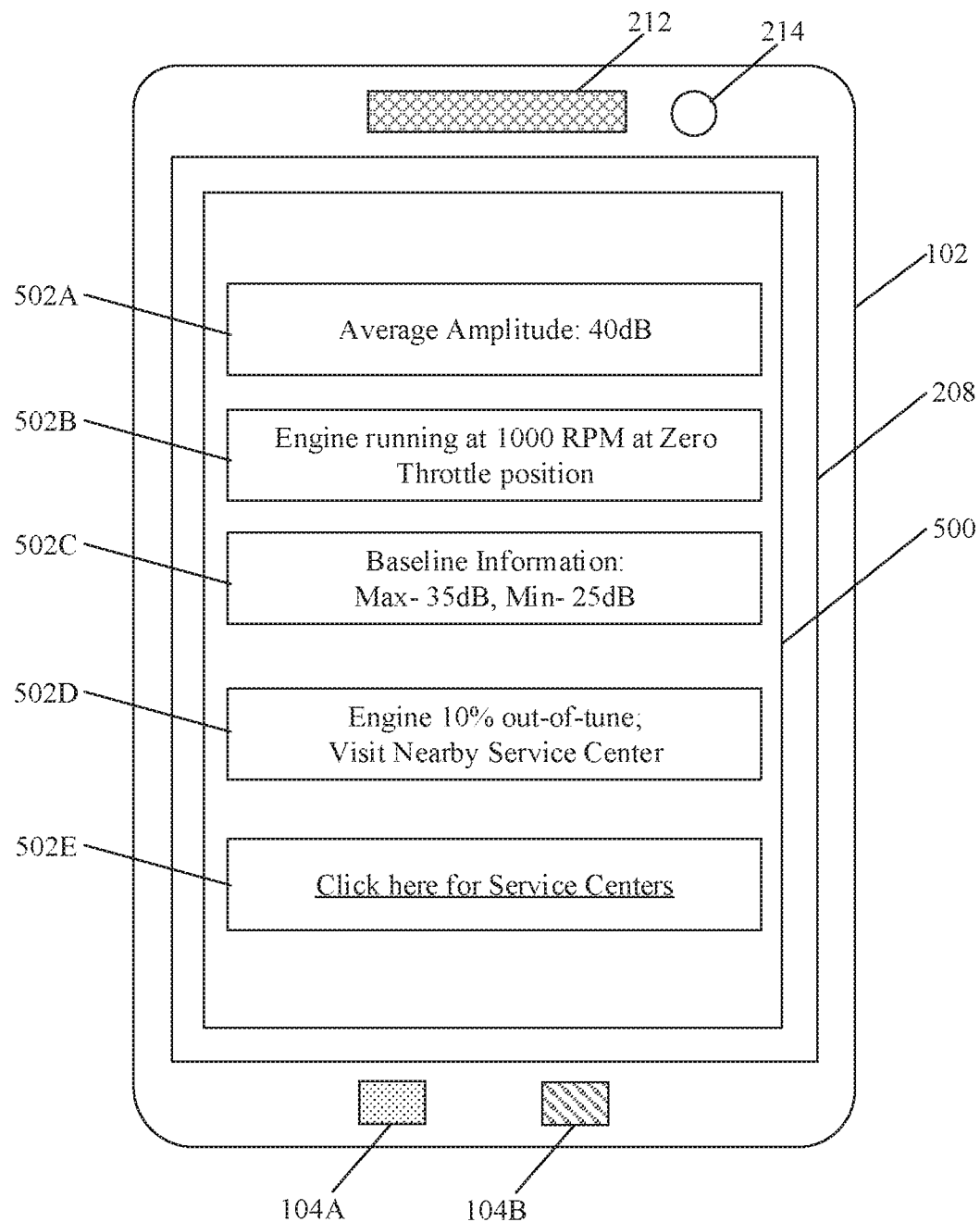
FIG. 5 illustrates an exemplary scenario of the mobile communication device to render information to provide tuning assistance for a motorcycle, in accordance with an embodiment of the disclosure.

FIG. 5 illustrates an exemplary scenario of the mobile communication device to render information to provide tuning assistance for a motorcycle, in accordance with an embodiment of the disclosure. FIG. 5 is explained in conjunction with elements from FIGS. 1, 2, 3, 4A, and 4B. With reference to FIG. 5, there is shown the mobile communication device 102. The mobile communication device 102 may include the audio capturing device 104a, the vibration capturing device 104b, the sound reproduction device 212, and the image capturing device 214.

It may be noted that positions and dimensions of the different components (such as the audio capturing device 104a, the vibration capturing device 104b, the sound reproduction device 212, and the image capturing device 214 of the mobile communication device 102 shown in FIG. 5 is merely an example. The present disclosure may be also applicable to other dimensions/positions of these components on the mobile communication device 102, without a deviation from scope of the disclosure.

There is further a user interface (UI) 500 displayed on the display screen 208. There is shown a plurality of UI options 502A to 502E which may display different information to provide tuning assistance to the user 116 for the motorcycle 106. The plurality of UI options 502A to 502E may include a first UI option 502A which may display the audio/vibration parameter (amplitude or frequency) extracted from the captured first signal 110. For example, the first UI option 502A may display information such as "Average amplitude of 40 dB" of the captured first audio signal. The plurality of UI options 502A to 502E may further include a second UI option 502B which may indicate the detected operational state from the plurality of operational states. The second UI option 502B may include measured RPM of the engine 108 and the throttle position of the motorcycle 106 as shown in FIG. 5. For example, as shown in FIG. 5, the second UI option 502B may display information such "Engine running at 1000 RPM at zero throttle position" as detected operational state.

The plurality of UI options 502A to 502E may further include a third UI option 502C which may display the range of baseline values for the detected operational state displayed in the second UI option 502B. For example, as shown in FIG. 5, the third UI option may display information such as "Amax: 35 dB & Amin: 25 dB" as the range of baseline values. The plurality of UI options 502A to 502E may further include a fourth UI option 502D which may display the generated tuning information described in FIG. 4A. For example, the fourth UI option 502D may display information such as "Engine 10% out-of-tune, visit nearby service center" as the generated tuning information. The plurality of UI options 502A to 502E may further include a fifth UI option 502E which may display a URL to provide information about the service centers or to connect with the service centers. Thus, the displayed plurality of UI options 502A to 502E may facilitate the user 116 to efficiently monitor the tuning status of the motorcycle 106 and effectively recommend different troubleshooting instructions.

Figure 6:
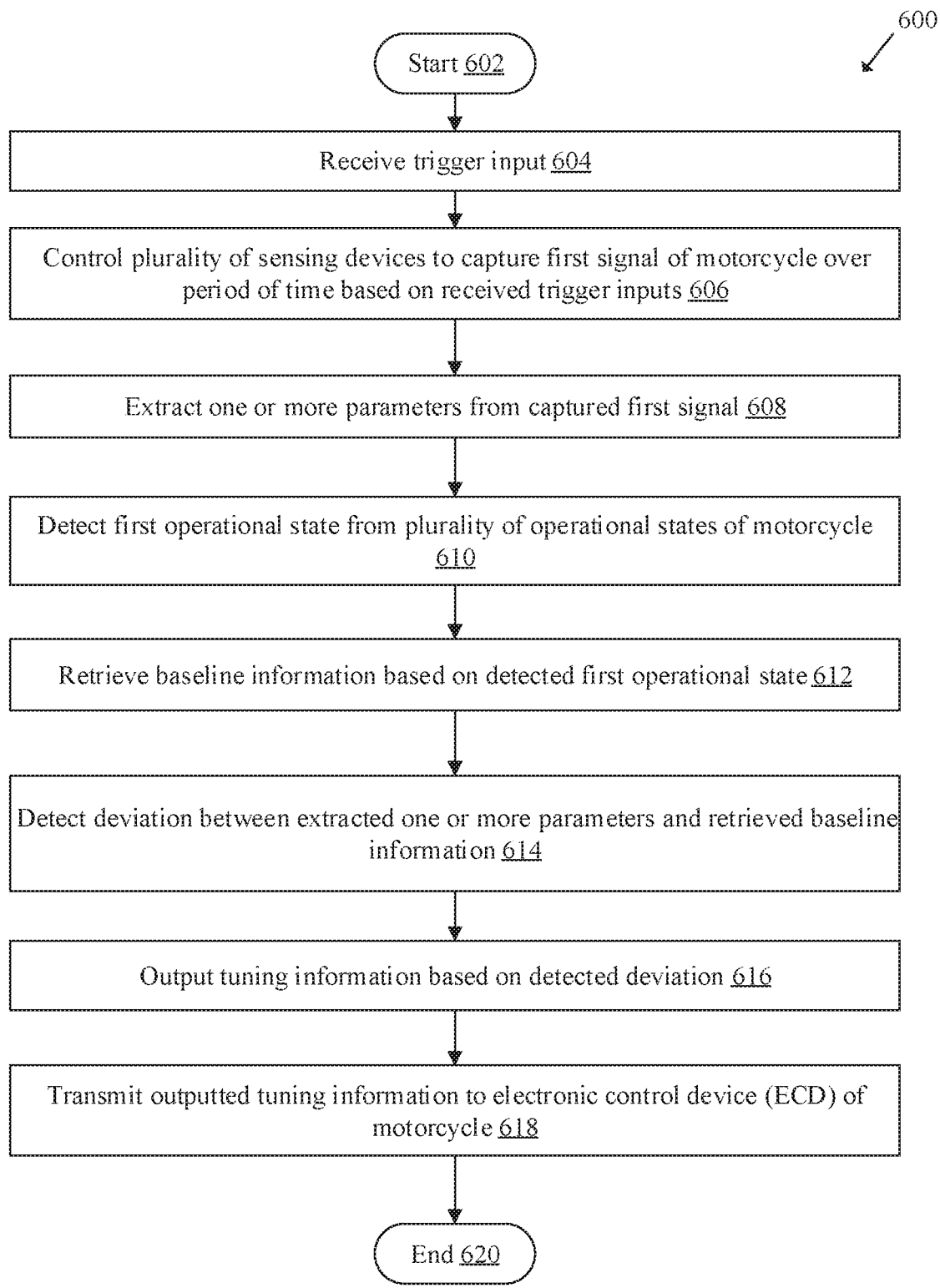
FIG. 6 depicts a flow chart that illustrates exemplary operations for a mobile communication device to provide tuning assistance for a motorcycle, in accordance with an embodiment of the disclosure.

FIG. 6 depicts a flow chart that illustrates exemplary operations for a mobile communication device to provide tuning assistance for a motorcycle, in accordance with an embodiment of the disclosure. With reference to 6, there is shown a flowchart 600. The flowchart 600 is described in conjunction with FIGS. 1, 2, 3, 4A, 4B, and 5. The operations from 602 to 620 may be implemented in the mobile communication device 102. The operations of the flowchart 600 may start at 602 and proceed to 604.

At 604, the trigger input may be received. The control circuitry 202 may be configured to receive the trigger inputs. Examples of the trigger input are described in detail, for example, in FIGS. 1 and 4A.

At 606, the plurality of sensing devices 104 may be controlled to capture the first signal 110 over a period of time based on the received trigger input. The first signal 110 may be sound or vibration produced by one or more components (for example engine 108) of the motorcycle 106. The control circuitry 202 may be configured to control the plurality of sensing devices 104 to capture the first signal 110 over the period of time.

At 608, one or more parameters may be extracted from the captured first signal 110. The control circuitry 202 may be configured to extract the one or more parameters from the captured first signal 110. The one or more parameters may include one or more audio parameters extracted from the first audio signal in the first signal 110, and further include one or more vibration parameters extracted from the first vibration signal in the first signal 110. The details of various audio parameters and respective extraction may be described in detail, for example, in FIGS. 4A and 4B.

At 610, a first operational state may be detected from a plurality of operational states of the motorcycle 106. The control circuitry 202 may be configured to detect the first operational state from the plurality of operational states as described in detail, for example, in FIG. 4A.

At 612, the baseline information may be retrieved based on the detected first operational state. The control circuitry 202 may be configured to retrieve the baseline information based on the detected first operational state. The baseline information may indicate a range of baseline values as described in detail, for example, in FIGS. 4A and 4B.

At 614, a deviation between the extracted one or more parameters and the retrieved baseline information may be detected. The control circuitry 202 may be configured to detect the deviation between the extracted one or more parameters and the retrieved baseline information as described in detail, for example, in FIGS. 4A and 4B.

At 616, the tuning information may be output based on the detected deviation. The control circuitry 202 may be configured to output or generate the tuning information based on the detected deviation. The tuning information may be output based on a determination that the detected deviation is out of the range of baseline values indicated by the retrieved baseline information. Examples of the tuning information are described in detail, for example, in FIG. 4A.

At 618, the output tuning information may be transmitted to the electronic control device (ECD) 220 of the motorcycle 106. The control circuitry 202 may be configured to transmit the tuning information to the electronic control device (ECD) 220 of the motorcycle 106, via the network 112. The electronic control device (ECD) 220 may utilize the tuning information for auto-tuning or to convert the out-of-tune status to the in-tune status of the motorcycle 106. Control passes to end 620.

Various embodiments of the disclosure provide a mobile communication device to provide tuning assistance for a motorcycle (such as the motorcycle 106 of FIG. 1). The mobile communication device (such as the mobile communication device 102 of FIG. 1) may include a plurality of sensing devices (such as the plurality of sensing devices 104 of FIG. 1) and control circuitry (such as the control circuitry 202 of FIG. 2). The control circuitry 202 may be configured to control the plurality of sensing devices 104 to capture a first signal (such as the first signal 110 of FIG. 1) over a period of time based on a trigger input. The first signal 110 may correspond to at least one component of the motorcycle in a first operational state from a plurality of operational states of the motorcycle. The control circuitry 202 may be further configured to extract one or more parameters from the captured first signal 110. The control circuitry 202 may be further configured to detect a deviation between the extracted one or more parameters and baseline information corresponding to the first operational state of the motorcycle 106. The deviation may indicate tuning information associated with the at least one component of the motorcycle, and the baseline information may indicate a range of baseline values. The control circuitry 202 may be further configured to output the tuning information based on a determination that the detected deviation is out of the range of baseline values.

In accordance with an embodiment, the plurality of sensing device 104 may include an audio capturing device (such as the audio capturing device 104a of FIG. 1) and a vibration capturing device (such as the vibration capturing device 104b of FIG. 1). The control circuitry 202 may be further configured to control the audio capturing device 104a to capture a first audio signal as the first signal 110 and control the vibration capturing device 104b to capture a first vibration signal as the first signal 110.

In accordance with an embodiment, the first audio signal and the first vibration signal may indicate a sound and a vibration generated by the motorcycle 106 in the first operational state respectively. The one or more parameters may comprise at least one of: one or more audio parameters or one or more vibration parameters. The one or more audio parameters may comprise a first amplitude level in decibels (dB) of the first audio signal, a first frequency of the first audio signal, or a direction-of-arrival (DOA) of the first audio signal. The one or more vibration parameters may comprise a second amplitude level of the first vibration signal, a second frequency of the first vibration signal.

The at least one component comprises an engine (such as the engine 108 of FIG. 1). The control circuitry 202 may be further configured to monitor at least one of a rotation per minute (RPM) of the engine 108 of the motorcycle 106 or a throttle position of the motorcycle 106 based on the first signal 110 captured over the period of time.

In accordance with an embodiment, the trigger input may be one of a user input received via a user interface (UI) of the mobile communication device 102 or a proximity between the mobile communication device 102 and the motorcycle 106. In some embodiments, the trigger input may be one of: a start of an engine of the motorcycle 106, an acceleration state of the motorcycle, a deacceleration state of the motorcycle 106, a particular rotation per minute (RPM) of the engine of the motorcycle 106, or particular throttle position of the motorcycle 106.

In accordance with an embodiment, the tuning information may include information about a degree at which the at least one component is out-of-tune. The mobile communication device 102 may further include a display screen (such as the display screen 208 of FIG. 2) and a sound reproduction device (such as the sound reproduction device 212 of FIG. 2). The control circuitry 202 may be further configured to output the tuning information through one of the display screen 208 or the sound reproduction device 212.

The mobile communication device 102 may further include a network interface (such as the network interface 204 of FIG. 2). The control circuitry 202 may be further configured to transmit, via the network interface 204, the tuning information to an engine control device (ECD) (such as the engine control device 220 of FIG. 2) of the motorcycle 106 for auto-tuning one or more parameters associated with the at least one component of the motorcycle 106.

In accordance with an embodiment, the control circuitry 202 may be further configured to receive, through the network interface 204, sensor data in the first operational state from the ECD 220 of the motorcycle 106, wherein the sensor data comprises a rotation per minute (RPM) of an engine 108 of the motorcycle 106, and a throttle position of the motorcycle 106. The control circuitry 202 may be further configured to determine the range of baseline values from a plurality of predefined baseline ranges based on the sensor data received from the ECD 220 of the motorcycle 106.

The mobile communication device 102 may further include a memory (such as the memory 206 of FIG. 2) configured to store the plurality of predefined baseline ranges associated with corresponding plurality of operational states of the motorcycle 106.

In accordance with an embodiment, the tuning information may include one or more troubleshooting instructions for the motorcycle 106 to minimize the deviation between the extracted one or more parameters and the baseline information corresponding to the first operational state of the motorcycle 106. The control circuitry 202 may be further configured to transmit, via the network interface 204, the tuning information, first identification information associated with the at least one component, and second identification information associated with the motorcycle 106 to a server (such as the diagnostic server 114 of FIG. 1).

The control circuitry 202 may be further configured to control the display screen 208 to display at least one of the extracted one or more parameters of the captured first audio signal, the baseline information, or the tuning information.

Various embodiments of the disclosure may provide a non-transitory, computer-readable medium and/or storage medium, and/or a non-transitory machine readable medium and/or storage medium stored thereon, a set of instructions executable by a machine and/or a computer providing tuning assistance for a motorcycle. The set of instructions may be executable by the machine and/or the computer to perform the steps that may comprise control of a plurality of sensing devices to capture a first signal over a period of time based on a trigger input. The first signal may correspond to at least one component of the motorcycle in a first operational state from a plurality of operational states of the motorcycle. The steps may further comprise extraction of one or more parameters from the captured first signal. The steps may further comprise detection of a deviation between the extracted one or more parameters and baseline information corresponding to the first operational state of the motorcycle. The deviation may indicate tuning information associated with the at least one component of the motorcycle, and the baseline information may indicate a range of baseline values. The steps may further comprise output of the tuning information based on a determination that the detected deviation is out of the range of baseline values.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. A mobile communication device to provide tuning assistance for a motorcycle, comprising:
a plurality of sensing devices located within the mobile communication device, the plurality of sensing devices comprising a microphone and an accelerometer;
control circuitry coupled to the plurality of sensing devices, wherein the control circuitry is configured to:
control one of the plurality of sensing devices to capture a first signal over a period of time based on a trigger input, wherein the first signal corresponds to at least one component of the motorcycle in a first operational state from a plurality of operational states of the motorcycle;
extract one or more parameters from the captured first signal;
detect a deviation between the extracted one or more parameters and baseline information corresponding to the first operational state of the motorcycle, wherein the deviation indicates tuning information associated with the at least one component of the motorcycle, and wherein the baseline information indicates a range of baseline values; and
output the tuning information based on a determination that the detected deviation is out of the range of baseline values; and
a display screen and a sound reproduction device, wherein the control circuitry is further configured to output the tuning information through one of the display screen or the sound reproduction device.

2. The mobile communication device, according to claim 1, where the plurality of sensing device comprise an audio capturing device and a vibration capturing device and wherein the control circuitry is further configured to control the audio capturing device to capture a first audio signal from the first signal and control the vibration capturing device to capture a first vibration signal from the first signal.

3. The mobile communication device accordingly to claim 2, wherein the first audio signal and the first vibration signal indicates a sound and a vibration generated by the motorcycle in the first operational state respectively.

4. The mobile communication device accordingly to claim 2, wherein the one or more parameters comprise at least one of: one or more audio parameters or one or more vibration parameters,
wherein the one or more audio parameters comprise a first amplitude level in decibels (dB) of the first audio signal, a first frequency of the first audio signal, or a direction-of-arrival (DOA) of the first audio signal, and
wherein the one or more vibration parameters comprise a second amplitude level of the first vibration signal, a second frequency of the first vibration signal.

5. The mobile communication device accordingly to claim 1, wherein the at least one component comprises an engine, and
wherein the control circuitry is further configured to monitor at least one of a rotation per minute (RPM) of the engine of the motorcycle or a throttle position of the motorcycle based on the first signal captured over the period of time.

6. The mobile communication device accordingly to claim 1, wherein the trigger input is one of a user input received via a user interface (UI) of the mobile communication device or a proximity between the mobile communication device and the motorcycle.

7. The mobile communication device accordingly to claim 1, wherein the trigger input is one of: a start of an engine of the motorcycle, an acceleration state of the motorcycle, a deacceleration state of the motorcycle, a particular rotation per minute (RPM) of the engine of the motorcycle, or particular throttle position of the motorcycle.

8. The mobile communication device accordingly to claim 1, wherein the tuning information includes information about a degree at which the at least one component is out-of-tune.

9. The mobile communication device accordingly to claim 1, further comprising a network interface, wherein the control circuitry is further configured to: transmit, via the network interface, the tuning information to an engine control device (ECD) of the motorcycle for auto-tuning one or more parameters associated with the at least one component of the motorcycle.

10. The mobile communication device accordingly to claim 9, wherein the control circuitry is further configured to:
receive, through the network interface, sensor data in the first operational state from the ECD of the motorcycle, wherein the sensor data comprises a rotation per minute (RPM) of an engine of the motorcycle, and a throttle position of the motorcycle; and
determine the range of baseline values from a plurality of predefined baseline ranges based on the sensor data received from the ECD of the motorcycle.

11. The mobile communication device accordingly to claim 10, further comprising a memory configured to store the plurality of predefined baseline ranges associated with corresponding plurality of operational states of the motorcycle.

12. The mobile communication device accordingly to claim 1, wherein the tuning information includes one or more troubleshooting instructions for the motorcycle to minimize the deviation between the extracted one or more parameters and the baseline information corresponding to the first operational state of the motorcycle.

13. The mobile communication device accordingly to claim 1, further comprising a network interface coupled to one or more processors,
wherein the control circuitry is further configured to transmit, via the network interface, the tuning information, first identification information associated with the at least one component, and second identification information associated with the motorcycle to a server.

14. The mobile communication device accordingly to claim 1, further comprising a display screen, wherein the control circuitry is further configured to control the display screen to display at least one of the extracted one or more parameters of the captured first signal, the baseline information, or the tuning information.

15. A method for providing tuning assistance for a motorcycle, the method comprising:
in a mobile communication device which includes a plurality of sensing devices, including a microphone and an accelerometer, and control circuitry:
controlling, by the control circuitry, the plurality of sensing devices to capture a first signal over a period of time based on a trigger input, wherein the first signal corresponds to at least one component of the motorcycle in a first operational state from a plurality of operational states of the motorcycle;
extracting, by the control circuitry, one or more parameters from the captured first signal;
detecting, by the control circuitry, a deviation between the extracted one or more parameters and baseline information corresponding to the first operational state of the motorcycle,
wherein the deviation indicates tuning information associated with the at least one component of the motorcycle, and wherein the baseline information indicates a range of baseline values; and
outputting, by the control circuitry, the tuning information through one of a display screen or a sound reproduction device on the mobile communication device based on a determination that the detected deviation is out of the range of baseline values.

16. The method accordingly to claim 15, wherein the tuning information includes information about a degree at which the at least one component is out-of-tune.

17. The method accordingly to claim 15, further comprising transmitting, via a network interface of the mobile communication device, the tuning information to an engine control unit (ECU) of the motorcycle for auto-tuning one or more parameters associated with the at least one component of the motorcycle.

18. The method accordingly to claim 15, wherein the tuning information includes one or more troubleshooting instructions for the motorcycle to minimize the deviation between the extracted one or more parameters and the baseline information corresponding to the first operational state of the motorcycle.

19. A non-transitory computer-readable medium having stored thereon, computer-executable instructions which, when executed by at least one processor of a mobile communication device, cause the at least one processor to execute operations, the operations comprising:

controlling, by the at least one processor, a plurality of sensing devices disposed in the mobile communication device to capture a first signal over a period of time based on a trigger input, wherein the first signal corresponds to at least one component of a motorcycle in a first operational state from a plurality of operational states of the motorcycle;

extracting, by the at least one processor of the mobile communication device, one or more parameters from the captured first signal;

detecting, by the at least one processor, a deviation between the extracted one or more parameters and baseline information corresponding to the first operational state of the motorcycle, wherein the deviation indicates tuning information associated with the at least one component of the motorcycle, and wherein the baseline information indicates a range of baseline values; and outputting the tuning information through one of a display screen or a sound reproduction device on the mobile communication device, by the at least one processor, based on a determination that the detected deviation is out of the range of baseline values.

* * * * *